(12) United States Patent
Gao et al.

(10) Patent No.: US 12,177,810 B2
(45) Date of Patent: Dec. 24, 2024

(54) REDUCING UNSUCCESSFUL PAGING

(71) Applicant: ZTE Corporation, Guangdong (CN)

(72) Inventors: Yuan Gao, Guangdong (CN); He Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 288 days.

(21) Appl. No.: 17/568,515

(22) Filed: Jan. 4, 2022

(65) Prior Publication Data

US 2022/0132466 A1    Apr. 28, 2022

Related U.S. Application Data

(63) Continuation of application No. PCT/CN2019/094841, filed on Jul. 5, 2019.

(51) Int. Cl.
*H04W 68/02* (2009.01)
*H04W 68/00* (2009.01)
*H04W 76/28* (2018.01)

(52) U.S. Cl.
CPC ......... *H04W 68/02* (2013.01); *H04W 68/005* (2013.01); *H04W 76/28* (2018.02)

(58) Field of Classification Search
CPC ... H04W 68/02; H04W 68/005; H04W 76/28; H04W 68/025
See application file for complete search history.

(56) References Cited

U.S. PATENT DOCUMENTS

| 10,057,879 | B2 * | 8/2018 | Hu | H04W 68/02 |
| 10,917,872 | B2 | 2/2021 | Liu et al. | |
| 11,503,565 | B2 | 11/2022 | Gao et al. | |
| 11,696,255 | B2 * | 7/2023 | Jung | H04W 76/10 |
| | | | | 370/329 |
| 2012/0300655 | A1 * | 11/2012 | Lee | H04W 24/00 |
| | | | | 370/252 |
| 2017/0367069 | A1 | 12/2017 | Agiwal et al. | |
| 2018/0332561 | A1 * | 11/2018 | Da Silva | H04W 76/27 |
| 2019/0104498 | A1 | 4/2019 | Jung et al. | |

(Continued)

FOREIGN PATENT DOCUMENTS

| CN | 108632995 A | 10/2018 |
| CN | 109548081 A | 3/2019 |

(Continued)

OTHER PUBLICATIONS

European Search Report for EP Patent Application No. 19937101.4, dated Jun. 30, 2022, 6 pages.

(Continued)

*Primary Examiner* — Habte Mered
(74) *Attorney, Agent, or Firm* — Perkins Coie LLP

(57) ABSTRACT

Methods, systems, and devices related to digital wireless communication, and more specifically, to techniques related to reducing unsuccessful paging. In one exemplary aspect, a method for wireless communication may include receiving a paging reception configuration from a communication node. The method may also include determining a first paging occasion and a second paging occasion associated with the terminal located along a time domain based on receiving the paging reception configuration. The method may also include receiving a paging message from the communication node during a second paging occasion.

16 Claims, 13 Drawing Sheets

(56) References Cited

U.S. PATENT DOCUMENTS

| | | | | |
|---|---|---|---|---|
| 2020/0084747 A1* | 3/2020 | Hong | ................... | H04W 72/23 |
| 2020/0120637 A1* | 4/2020 | Hu | ................... | H04W 72/0446 |
| 2020/0205122 A1* | 6/2020 | Liu | ................... | H04W 76/11 |
| 2020/0280957 A1* | 9/2020 | Gao | ................... | H04L 5/0094 |
| 2020/0296685 A1* | 9/2020 | Tang | ................... | H04W 76/28 |
| 2020/0305120 A1* | 9/2020 | Tang | ................... | H04W 68/00 |
| 2021/0410106 A1* | 12/2021 | Wang | ................... | H04W 72/23 |
| 2022/0104174 A1* | 3/2022 | Liu | ................... | H04W 68/02 |
| 2022/0295446 A1* | 9/2022 | Liu | ................... | H04W 68/04 |

FOREIGN PATENT DOCUMENTS

| | | | |
|---|---|---|---|
| CN | 109661031 | A | 4/2019 |
| WO | 2016163940 | A1 | 10/2016 |
| WO | 2018/084761 | A | 5/2018 |
| WO | 2019095941 | A1 | 5/2019 |

OTHER PUBLICATIONS

Chinese office action issued in CN Patent Application No. 201980098221.8, dated May 27, 2023, 16 pages. English translation included.

International Search Report and Written Opinion mailed on Mar. 26, 2020 for International Application No. PCT/CN2019/094841, filed on Jul. 5, 2019 (6 pages).

Nokia et al. "Downlink aspects of TDD support in NB-IoT." 3GPP TSG RAN WG1 Meeting #93, Busan, Korea, R1-1806166, 6 pages, May 21-25, 2018.

Qualcomm Incorporated, "Paging Procedure," 3GPP TSG RAN WG3 Meeting #95, Athens, Greece, R3-170642, 4 pages, Feb. 13-17, 2017.

Chinese Notification to Complete Formalities of Registration issued in CN Patent Application No. 201980098221.8, dated Jan. 16, 2024, 6 pages. English translation included.

ZTE Corporation, "Consideration of UE Paging DRX Configuration," 3GPP TSG-RAN2 Meeting #97, R2-1701411, Athens, Greece, Feb. 13-17, 2017, 4 pages.

INTEL Corporation,"Longer paging DRX cycles for power saving purposes," 3GPP TSG RAN WG2 Meeting #106, R2-1906424, Reno, USA, May 13-17, 2019, 4 pages.

Ericsson, "Power consumption reduction for paging and connected-mode Drx," 3GPP TSG-RAN1#88bis, R1-1705182, Spokane, Washington, USA, Apr. 3-7, 2017, 3 pages.

European Communication pursuant to Article 94(3) EPC issued in EP Patent Application No. 19937101.4, dated Jul. 31, 2024, 5 pages.

Vietnamese office action issued in VN Patent Application No. 1-2022-00652, dated Aug. 29, 2024, 2 pages. English translation included.

* cited by examiner

REDUCING UNSUCCESSFUL PAGING

CROSS-REFERENCE TO RELATED APPLICATIONS

This application is a continuation of International Patent Application No. PCT/CN2019/094841, filed on Jul. 5, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to reducing unsuccessful paging.

In one exemplary aspect, a method for wireless communication includes receiving a paging reception configuration from a communication node. The method also includes determining a first paging occasion and a second paging occasion associated with the terminal located along a time domain based on receiving the paging reception configuration. The method also includes receiving a paging message from the communication node during a second paging occasion.

In another exemplary aspect, a method for wireless communication includes configuring a first paging occasion and a second paging occasion associated with a terminal. The method also includes determining whether to send a paging message on a second paging occasion. The method also includes transmitting a paging record to the terminal in both the first paging occasion and the second paging occasion associated with the terminal.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions.

1. A method for wireless communication comprising receiving, by a terminal, a paging reception configuration from a communication node, determining, by the terminal, a first paging occasion and a second paging occasion associated with the terminal located along a time domain based on receiving the paging reception configuration; and receiving, by the terminal, a paging message from the communication node during the paging occasion.

2. The method of claim 1, further comprising: determining, by the terminal, a location of the second paging occasion based on a location of the first paging occasion., wherein the location of the first paging occasion is determined by a specified formula.

3. The method of solution 1, wherein a location of the second paging occasion is located offset to the location of the first paging occasion in the time domain.

4. The method of solution 3, wherein the location of the second paging occasion that is offset to the location of the first paging occasion is either fixed or configured from the communication node to the terminal by radio resource control (RRC) signaling.

5. The method of solution 4, wherein the RRC signaling comprises one of broadcast system information and dedicated RRC signaling.

6. The method of solution 3, wherein the offset of the location of the second paging occasion to the location of the first paging occasion is one of positive or negative, wherein a positive offset indicates that the location of the second paging occasion is after the location of the first paging occasion, and wherein a negative offset indicates that the location of the second paging occasion is before the location of the first paging occasion.

7. The method of solution 1, further comprising: determining, by the terminal, the location of the second paging occasion based on a second paging identifier indicative of the second paging occasion, where the second paging identifier is different from an identifier associated with the first paging occasion.

8. The method of solution 7, further comprising: transmitting, by the terminal, the second paging identifier to any of the communication node or a core network node.

9. The method of solution 7, further comprising: receiving, by the terminal, the second paging identifier from a core network node.

10. The method of solution 1, further comprising: receiving, by the terminal, a paging record at both the first paging occasion and the second paging occasion associated with the terminal.

11. The method of solution 1, further comprising: receiving, by the terminal, a corresponding paging record on one of the first paging occasion or the second paging occasion associated with the terminal during a paging discontinuous reception (DRX) cycle; and skipping, by the terminal, reception of the paging message on one of the first paging occasion or the second paging occasion during the paging DRX cycle.

12. The method of solution 1, further comprising: monitoring, by the terminal, paging from a second cell after determining that a corresponding paging record was not received on either the first paging occasion or the second paging occasion associated with the terminal.

13. A method for wireless communication, comprising: configuring, by a communication node, a first paging occasion and a second paging occasion associated with a terminal; determining, by the communication node, whether to send a paging message on a second paging occasion; and transmitting, by the communication node, a paging record to the terminal in both the first paging occasion and the second paging occasion associated with the terminal.

14. The method of solution 13, further comprising: receiving, by the communication node, capability information relating to the terminal from a core network node to determine whether to send the paging record on the second paging occasion, wherein the capability information relating to the terminal is included in any of the paging message or an initial context setup request message.

15. The method of solution 13, further comprising: transmitting, by the communication node, a paging reception configuration to the terminal, wherein the terminal is configured to determine the second paging occasion associated with the terminal based on receiving the paging reception configuration.

16. The method of solution 15, wherein the paging reception configuration is transmitted to the terminal via one of broadcast system information or dedicated RRC signaling.

17. The method of solution 13, further comprising: receiving, by the communication node, a second paging identifier identifying the second paging occasion from any of the terminal or a core network node.

18. The method of claim 13, wherein a location of the second paging occasion is based on both a second paging identifier identifying the second paging occasion and a specified formula, the specified formula including: (SFN+ PF_offset) mod T=(T div N)*(UE_ID mod N).

19. The method of solution 13, wherein a location of the second paging occasion is located offset to a location of the first paging occasion calculated based on the specified formula in the time domain, wherein the offset is either fixed or configured from the communication node to the terminal by RRC signaling.

20. The method of solution 19, wherein the offset of the location of the second paging occasion to the location of the first paging occasion is one of positive or negative, wherein a positive offset indicates that the location of the second paging occasion is after the location of the first paging occasion, and wherein a negative offset indicates that the location of the second paging occasion is before the location of the first paging occasion.

21. The method of any of solutions 3 and 19, wherein the location of the second paging occasion is located offset to the location of the first paging occasion by at least one radio frame.

22. The method of any of solutions 3 and 19, wherein the location of the second paging occasion is located offset to the location of the first paging occasion by at least one slot.

23. The method of any of solutions 3 and 19, wherein the location of the second paging occasion is located offset to the location of the first paging occasion by at least one orthogonal frequency-division multiplexing (OFDM) symbol.

24. The method of any of solutions 3 and 19, wherein the location of the second paging occasion is located offset to the location of the first paging occasion by at least one paging frame.

25. The method of any of solutions 3 and 19, wherein the location of the second paging occasion is located offset to the location of the first paging occasion by at least one paging occasion.

26. The method of solution 13, further comprising: transmitting, by the communication node, the paging record to the terminal on any of the first paging occasion, the second paging occasion during a paging DRX cycle, wherein the terminal is configured to skip reception of one of the paging occasion upon receiving the paging record on the other during the paging DRX cycle.

27. An apparatus for wireless communication comprising a processor that is configured to carry out the method of any of solutions 1 to 26.

28. A non-transitory computer readable medium having code stored thereon, the code when executed by a processor, causing the processor to implement a method recited in any of solutions 1 to 26.

The details of one or more implementations are set forth in the accompanying attachments, the drawings, and the description below. Other features will be apparent from the description and drawings, and from the claims.

DETAILED DESCRIPTION

Figure 1A:
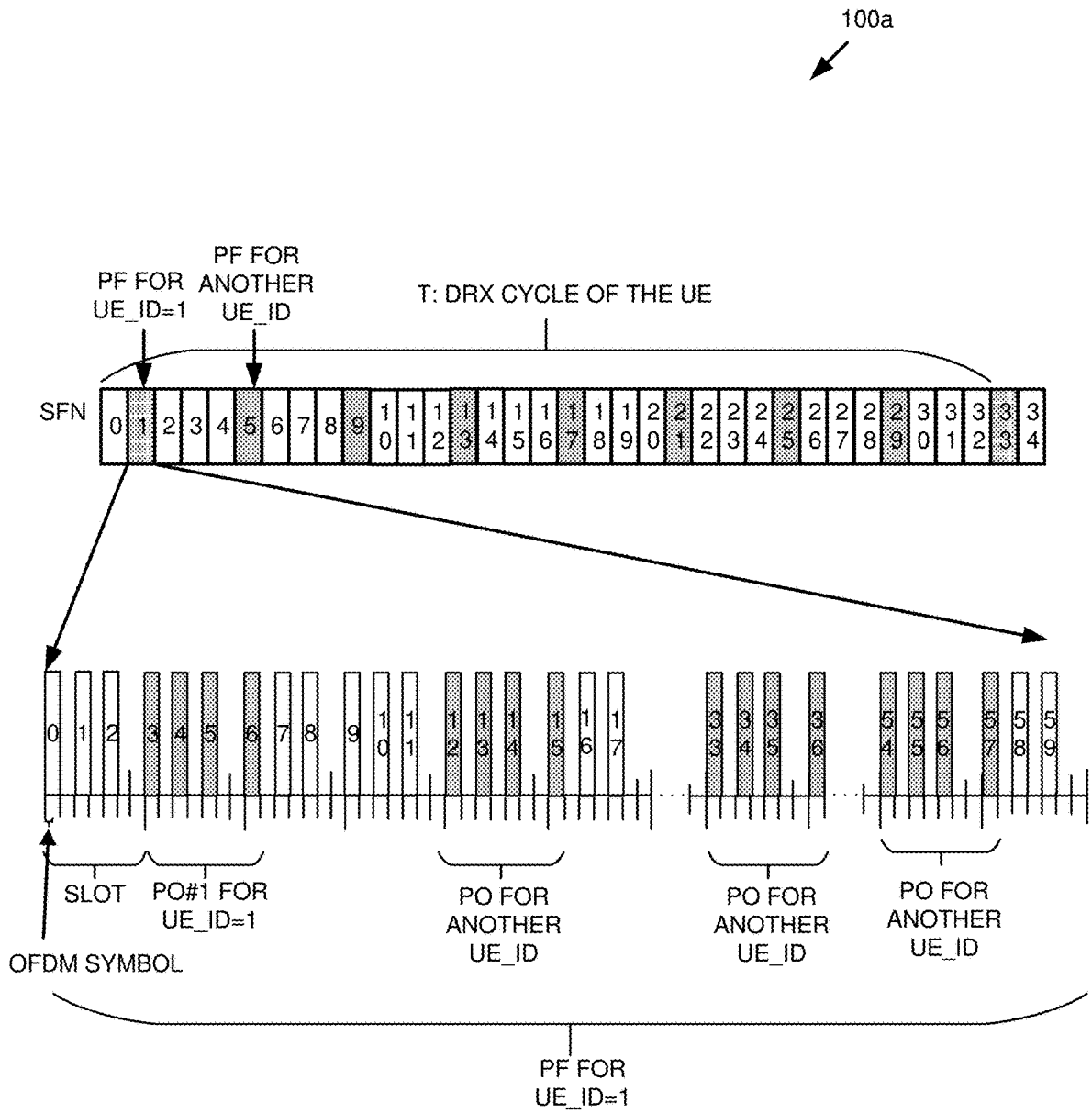
FIG. 1A illustrates a block diagram of an example series of paging frames and a paging occasion.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

This patent document describes techniques that can be implemented to avoid or reduce paging collision. Paging collisions may include instances of paging messages associated with multiple Universal Mobile Telephone System (UMTS) Subscriber Identify Modules (USIMs) that overlap in time. In this event, the terminals (UEs) operating as a single receiver may make a choice of monitoring a single paging channel at a time, which may lead to unsuccessful paging on other paging channels.

Overview

In NR, a UE may monitor a physical downlink control channel (PDCCH) monitoring occasion for paging. The UE may monitor one paging occasion (PO) in a paging frame (PF) within a Discontinuous Reception (DRX) cycle. Reception of paging message on paging occasion may refer to monitoring the PDCCH addressed to paging RNTI on the paging occasion. A System Frame Number (SFN) for a PF may be determined by: (SFN+PF_offset) mod T=(T div N)*(UE_ID mod N). An Index (i_s) may indicate that the index of the PO is determined by: i_s=floor (UE_ID/N) mod Ns.

The following parameters may be utilized in calculating a PF and/or an i_s. T may equal a Discontinuous Reception (DRX) cycle of the UE. T may be determined by the shortest UE-specific DRX value, if configured by RRC or upper layers, and a default DRX value broadcast in system information. If a UE specific DRX is not configured by radio resource control (RRC) or by upper layers, the default value may be applied. N may equal a number of total paging frames in T. Ns may equal number of paging occasions for a PF. PF_offset may include an offset used for PF determination. UE_ID may include a 5G S-Temporary Mobile Subscriber Identity (5G-S-TMSI) mod 1024.

The PDCCH monitoring occasions for paging may be determined according to pagingSearchSpace and firstPDCCH-MonitoringOccasionOfPO, if configured. Alternatively, if SearchSpaceId=0 and configured for pagingSearchSpace, the PDCCH monitoring occasions for paging may be the same as for Remaining Minimum System Information (RMSI). The UE_ID may include the 10 least significant bits of 5G-S-TMSI, which may be allocated by the serving network. PF_offset, T, N, Ns may all be configured by the serving network.

A UE with multiple USIMs may be in operation at the same time. Each USIM may be viewed as a separate device with respect to the network and can camp on different cells for service. Each USIM within a UE may be paged by the serving cell separately and may monitor the PDCCH occasion for paging based on the configuration from each serving gNB. Considering that the gNB associated with one USIM may not have an idea on the paging UE ID (LSB 10 bits of 5G-S-TMSI) and the paging resource configuration used in the other gNB associated to the other USIM, in some instances, the paging occurrences associated with multiple USIMs may overlap in time.

Paging collision may refer to the situation of multiple paging occurrences associated with the multiple USIMs that overlap at an instance in time. UEs operating as a single Rx may need to make a choice of monitoring a single paging channel at a time, which can lead to unsuccessful paging on the other paging channel(s).

System Overview

The present application relates avoiding paging collision or reducing unsuccessful paging when paging collision occurs. From the perspective of a UE, the UE may receive a configuration for paging reception from a network (NW) and determine an additional paging occasion based on the received configuration. This may include the step of the UE receiving a configuration for paging reception from the NW side. This may also include the step of the UE determining an additional paging occasion based on the received configuration.

Alternatively, from a perspective of a base station (gNB) associated with any of the USIMs included in a UE may coordinate with other gNBs to avoid paging to the UE with different USIMs in the same time interval.

The NW node (e.g., a base station) may send a paging message on an additional paging occasion to a UE in specific instances. The base station may receive UE capability from a Core Network Node via an interface such as a S1 or NG-C interface, for example, to determine whether the additional paging occasion can be supported by a UE and/or determine to send a paging message on an additional paging occasion to UE. In the interface (e.g., S1 or NG-C), the UE capability can be included in the Paging message, or together with other UE capability information in InitialContextSetupRequest.

Since the base station can be divided into a Centralized Unit (CU) and Distributed Unit (DU), a PAGING message that can include paging information may be sent from CU to DU to enable DU to page the UE. The DU may receive UE capability information from CU via an interface, such as a F1 interface, to determine the additional paging occasion can be supported by a UE and/or determine whether to send a paging message on an additional paging occasion to UE. In the F1 interface, the UE capability can be included in the PAGING message.

The UE may monitor the additional paging occasion to receive paging in a cell in specific instances. The configuration for the paging reception during an additional paging occasion can be included in either system information or dedicated signaling. For the case in which the UE is released to INACTIVE state, the configuration for the reception of an additional PO can be included in the RRC release message.

For a UE in an RRC_INACTIVE state, the UE may only need to monitor the additional paging occasion to receive paging if the following conditions are satisfied. A first condition may include the reception of an additional paging occasion configured in the RRC release message with which the UE may move to an RRC_INACTIVE state. A second condition may include the configuration of the paging occasion being broadcasted in system information of the cell in which the UE is camped.

The UE may determine the location of the additional paging occasion using specific techniques. The UE may determine the location of additional paging occasion based on the location of the first paging occasion. The additional paging occasion may be located offset after the paging occasion in the time domain. The offset can either be fixed or configurable by RRC signaling (e.g. in either system information or dedicated signaling).

The first paging occasion may include a paging occasion supported by a legacy standard, and the location of first paging occasion is determined by a formula specified in standard:

The first paging frame (PF) and first paging occasion (PO) may be determined by the following formula:

SFN for the PF is determined by:

$$(SFN+PF\_offset) \bmod T = (T \text{ div } N)*(UE\_ID \bmod N)$$

Index (i_s), indicating the index of the PO is determined by:

$$i\_s = \text{floor}(UE\_ID/N) \bmod Ns$$

The following parameters are used for the calculation of PF and i_s above:

T: DRX cycle of the UE (T is determined by the shortest of the UE specific DRX value, if configured by RRC or upper layers, and a default DRX value broadcast in system information. If UE specific DRX is not configured by RRC or by upper layers, the default value is applied).

N: number of total paging frames in T

Ns: number of paging occasions for a PF

PF_offset: offset used for PF determination

UE_ID: 5G-S-TMSI mod 1024

The location of the first paging occasion inside the first paging frame are determined according to pagingSearchSpace and firstPDCCH-MonitoringOccasionOfPO if configured. Otherwise, when SearchSpaceId=0 is configured for pagingSearchSpace, the location of the first paging occasion are same as the location PDCCH monitoring occasion for RMSI which is specified in the current specifications. The UE_ID may include the 10 least significant bits of 5G-S-TMSI, which is allocated by the serving network. PF_offset, T, N, Ns and are all configured by the serving network.

The UE may calculate the additional paging occasion based on the additional paging UE ID. From a base station (e.g. eNB or gNB) point of view, the additional paging ID can be either from a core network node or from the UE. The UE may inform the additional paging UE ID to a base station directly. The UE may inform the additional paging UE ID to the Core Network, and Core Network may inform the base station (e.g. eNB or gNB) of the additional UE ID. Core network may inform the additional paging UE ID to both UE and base station (e.g. eNB or gNB).

In some embodiments, the offset may be configurable. In a first instance, the offset may be given in any of a radio frame level, slot level, or a symbol level (e.g. the number of radio frames and/or slots and/or symbols between the first paging occasion and the additional paging occasion). In a second instance, the offset may be given in a paging frame level and/or a PO level (e.g. the number of paging frames and/or POs between the first paging occasion and the additional paging occasion). In a third instance, a radio frame level offset may be provided to determine the location of radio frame, and the location of the additional paging occasion within the radio frame may be the same as the location of the first paging occasion within the first paging frame. In a fourth instance, a paging frame level offset may be given to determine the location of a paging frame, and the location of the additional paging occasion within the radio frame may be the same as the location of the first paging occasion within the first paging frame.

The offset can be either a positive value (e.g. additional paging occasion is after the first paging occasion in the time domain) or a negative value (e.g. additional paging occasion is before the first paging occasion in the time domain).

Zero or one or more additional paging occasions may be configured. For the case when more than one additional paging occasions is configured, a common offset, an offset between the first paging occasion and the first additional paging occasion, as well as the offset between two consecutive additional paging occasions or a list of offsets, each of which is the offset between the first paging occasion and one specific additional paging occasion, can be given. The number of the additional paging occasions and/or the common offset or a list of offsets can be fixed in specs or configurable by RRC signaling (e.g. in either system information or dedicated signaling).

The length of the additional paging occasion can be the same as or different from the first paging occasion. The length of the addition paging occasion (e.g. the number of symbols or slots) can be either be fixed in specs or configurable by RRC signaling (e.g. in either system information or dedicated signaling).

Both the first paging occasion and second paging occasion may be located in a time domain periodically. The period for the first paging occasion and second paging occasion is the same. Or, in some embodiments, the period for the first paging occasion and second paging occasion can be configured separately.

For the concerned UE, an identical paging record shall be sent on both the first paging occasion and the additional paging occasion. If the corresponding paging record is not detected in one paging occasion associated with the UE, the UE can then assume that no paging record will be transmitted in the rest of paging occasions associated with the UE within the same paging DRX. For each paging DRX cycle, once the corresponding paging record is received on the first paging occasion (corresponding PagingUE-Identity is found in the paging record), the UE can ignore/skip the reception of additional paging occasion. Alternatively, for each paging DRX cycle, once the corresponding paging record is received on the additional paging occasion (corresponding PagingUE-Identity is found in the paging record), the UE can ignore/skip the reception of the first paging occasion.

FIG. 1A illustrates a block diagram 100a of an example series of paging frames and a paging occasion. The SFN of the PF for UE_ID=1 may be determined by: (SFN+PF_offset) mod T=(T div N)*(UE_ID mod N). Index (i_s) may indicate the index of the PO, which may be determined by: i_s=floor (UE_ID/N) mod Ns.

The following parameters are used for the calculation of PF and i_s: T: DRX cycle of the UE. N: number of total paging frames in T. Ns: number of paging occasions for a PF. PF_offset: offset used for PF determination.

The PDCCH monitoring occasions for paging may be determined according to pagingSearchSpace and firstPDCCH-MonitoringOccasionOfPO, if configured.

The following configuration for paging occasion may be broadcast in system information of the cell, in which the UE is camped:

T: 32 radio frames
N: 8
Ns: 2
PF_offset: 0
Carrier frequency: <3 GHz
Subcarrier spacing: 30 kHz (⇒slot duration: 500 μs⇒20 slots in a radio frame)
CORESET length: 2 OFDM symbols
Number of beams: 4
Ns: 4 (i.e. 4 POs per PF)
Monitoring-periodicity-PDCCH-slot: 1
Monitoring-offset-PDCCH-slot: 0
Monitoring-symbols-PDCCH-within-slot: 11001100110000
First-PDCCH-monitoring-occasion-of-PO: 3 (for PO 1), 12 (for PO2), 33 (for PO 3), 54 (for PO4)

The Setting Monitoring-periodicity-PDCCH-slot may equal 1 and Monitoring-offset-PDCCH-slot may equal 0, which may indicate that the corresponding TS 38.331 parameter monitoringSlotPeriodicityAndOffset may contain the parameter sl1 set to a NULL value. The Monitoring-symbols-PDCCH-within-slot parameter may be a 14 bits long bitmap/bit string. Each bit in this bit string may represent an OFDM symbol in a slot. A bit set to one may indicate that the OFDM slot is a potential OFDM slot to monitor. This value may be assigned to the corresponding TS 38.331 parameter monitoringSymbolsWithinSlot.

Example Embodiment 1

A network node may receive UE capability information from a core network node using any of a S1 or NG-C interface and determine to send a paging message on an additional paging occasion for UE_ID=1.

The additional paging occasion may be located offset after the first paging occasion. The NW may include a configuration for the reception of an additional paging occasion, which may be the offset in a PO level and provides to UE via system information.

The PO level offset "+0" may be configured to UE via system information. The offset "+0" may indicate that the additional paging occasion is after the first paging occasion and there is no PO between the first paging occasion and the additional paging occasion (i.e., the additional paging occasion may include the PO right after the first paging occasion).

Figure 1B:
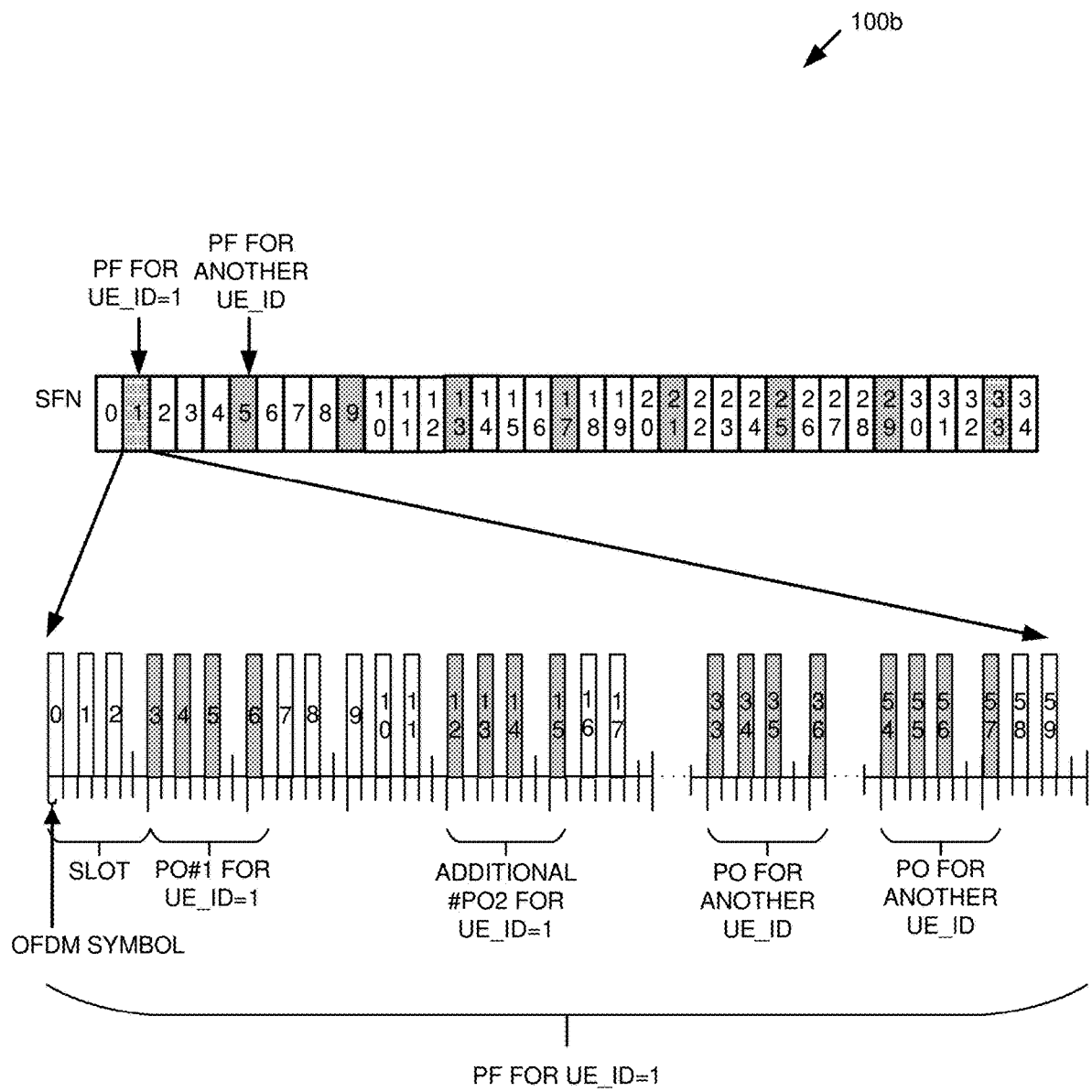
FIG. 1B illustrates a block diagram of a first example series of paging frames and an offset paging occasion.

FIG. 1B illustrates a block diagram 100b of a first example series of paging frames and an offset paging occasion. As shown in FIG. 1B, in addition to the PO #1, an additional PO (PO #2) right after PO #1 may be configured as the addition paging occasion for UE_ID=1. For the relevant UE, an identical paging record may be sent on both the first paging occasion (PO #1) and the additional paging occasion (PO #2). For each paging DRX cycle, once the corresponding paging record is received on the first paging occasion (i.e., the corresponding PagingUE-Identity may be found in the paging record), the UE can ignore/skip the reception of additional paging occasion. The UE may begin to monitor paging from another cell after receiving paging from one cell on the first paging occasion or additional paging occasion.

Figure 1C:
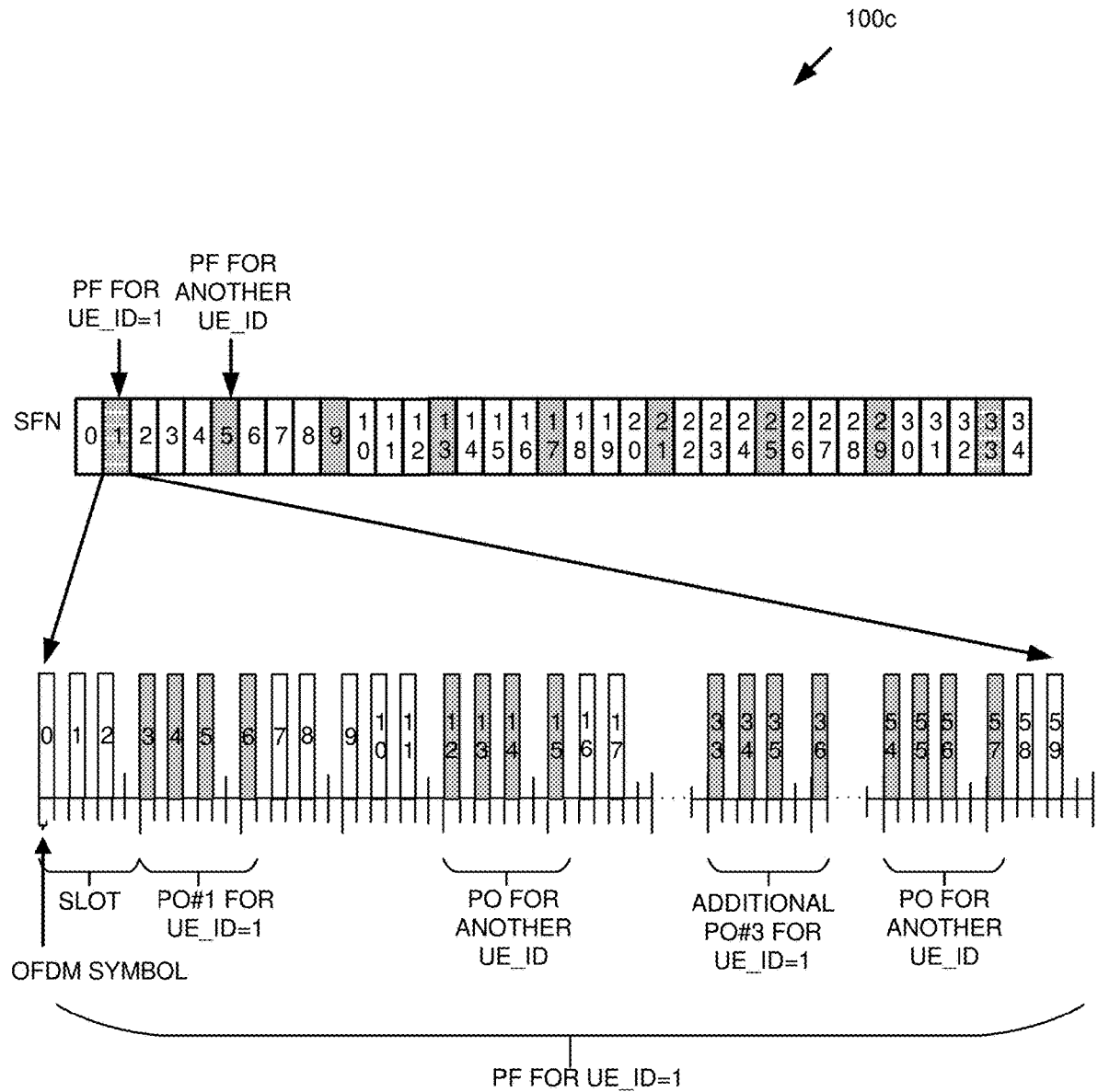
FIG. 1C illustrates a block diagram of a second example series of paging frames and an offset paging occasion.

FIG. 1C illustrates a block diagram 100c of a second example series of paging frames and an offset paging occasion. Similarly, as shown in FIG. 1C, the PO level offset "+1" may be configured to the UE, which may indicate that the additional paging occasion is after the first paging occasion (PO #1) and there is one PO between the first paging occasion and the additional paging occasion. In addition to the PO #1, an additional PO (PO #3) may be configured as the additional paging occasion for UE_ID=1. For the relevant UE, an identical paging record may be sent on both the paging occasion and the additional paging occasion. For each paging DRX cycle, once the corresponding paging record is received on the additional paging occasion (i.e., the corresponding PagingUE-Identity may be found in the paging record), the UE can ignore/skip the reception of the first paging occasion. The UE may start to monitor paging from another cell after receiving paging from one cell on the first paging occasion or additional paging occasion.

Example Embodiment 2

Figure 2A:
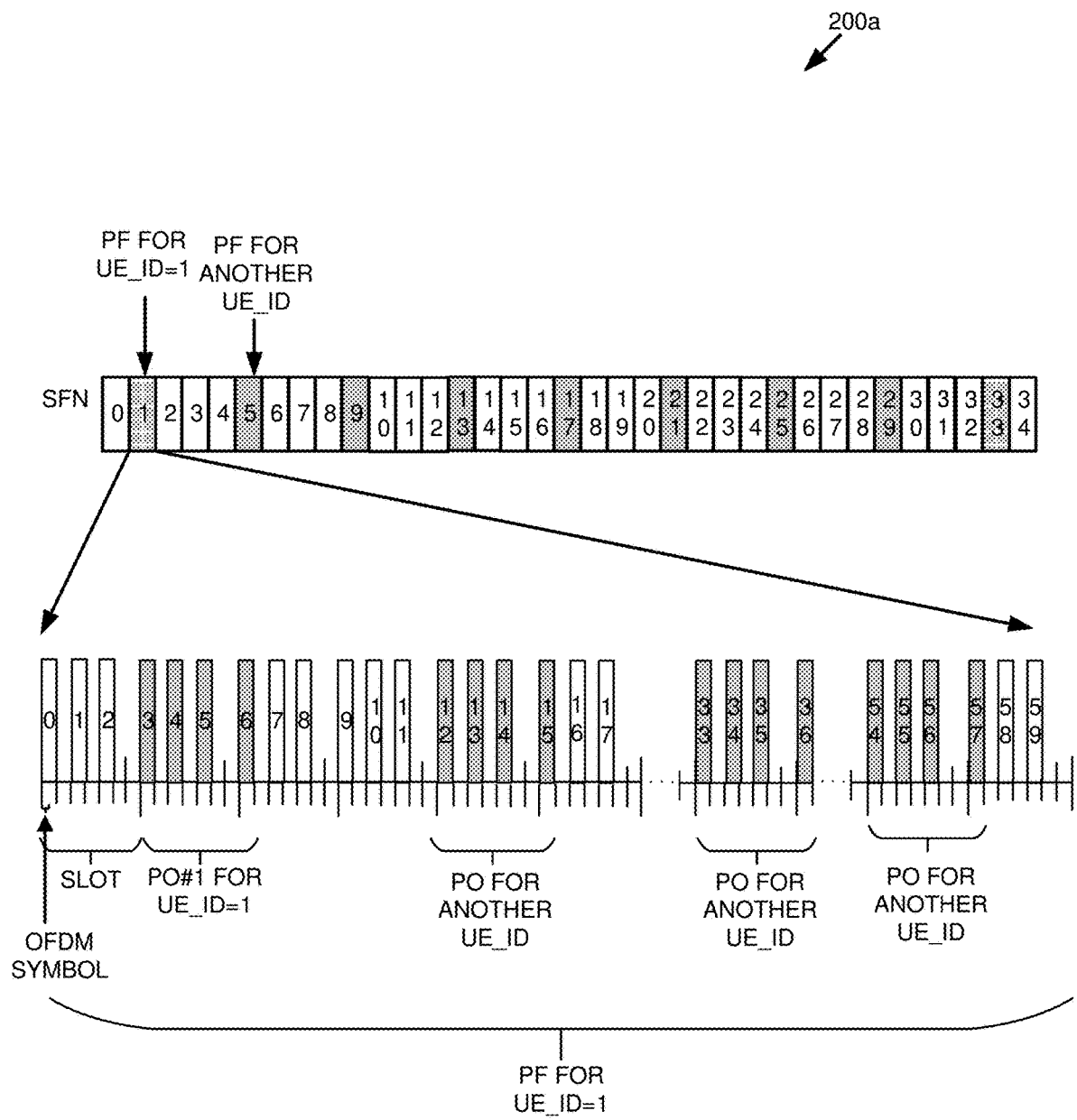
FIG. 2A illustrates a block diagram of an example series of paging frames and a paging occasion.

FIG. 2A illustrates a block diagram 200a of an example series of paging frames and a paging occasion. In a second example embodiment, the network may receive UE capability information from a core network via a S1 or NG-C interface and determine to send a paging message on an additional paging occasion for UE_ID=1. The additional paging occasion may be located offset after the first paging occasion. The NW may include a configuration for the reception of additional paging occasion which is the offset in symbol level in the RRCRelease message and may send to the UE to release it into RRC_INACTIVE state.

Figure 2B:
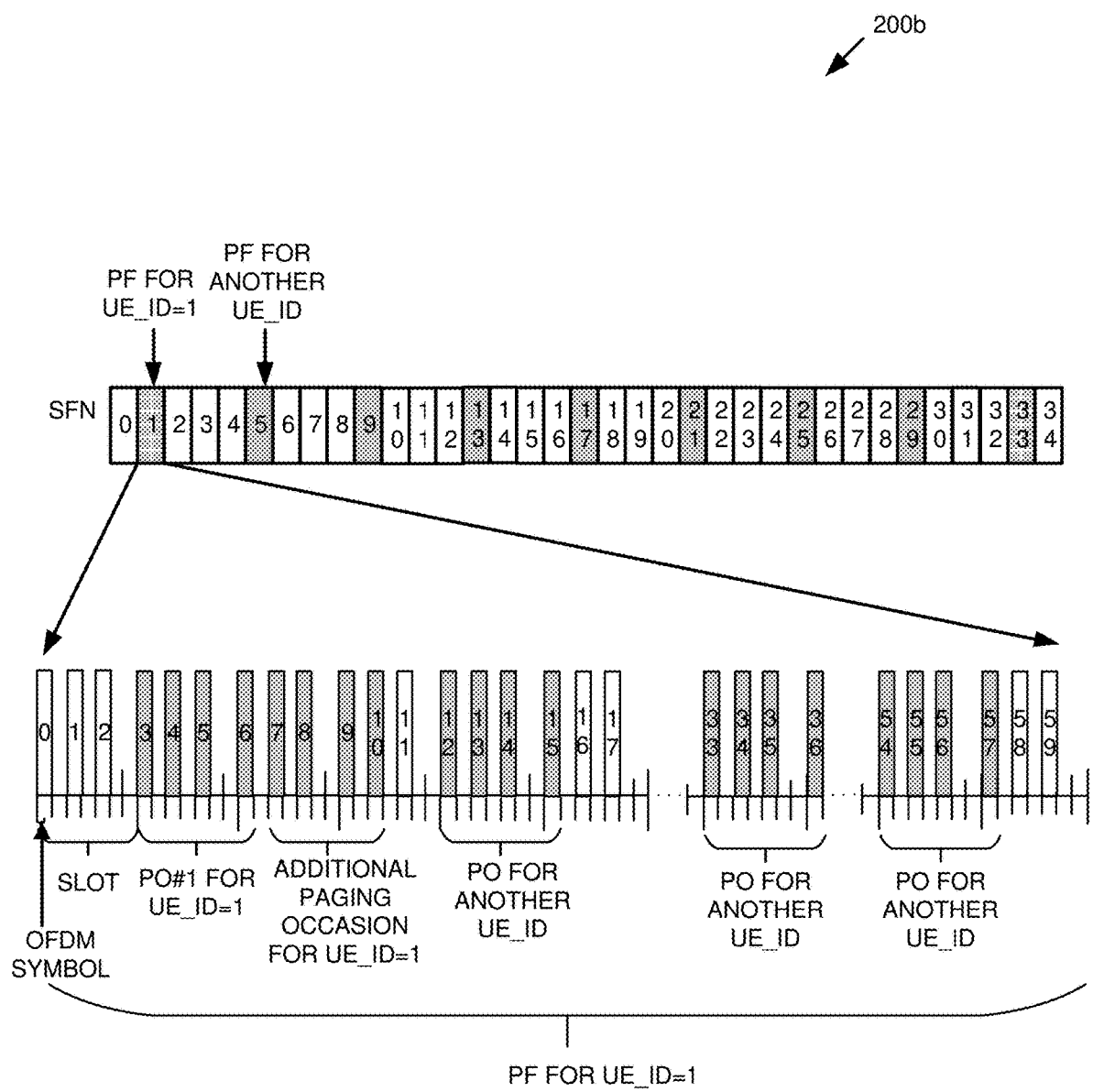
FIG. 2B illustrates a block diagram of a first example series of paging frames and a paging occasion with a symbol level offset.

FIG. 2B illustrates a block diagram 200b of a first example series of paging frames and a paging occasion with a symbol level offset. The symbol level offset "+2" may be configured to the UE via RRCRelease message. The offset "+2" may indicate that the additional paging occasion is after the first paging occasion and there is two OFDM symbols between the first paging occasion and the additional paging occasion. As shown in FIG. 2B, in addition to the PO #1, an additional paging occasion with the same length as the PO calculated may be configured as the paging occasion for UE_ID=1. For the relevant UE, an identical paging record may be sent on both the first paging occasion and the additional paging occasion. For each paging DRX cycle, once the corresponding paging record is received on the first paging occasion (i.e., the corresponding PagingUE-Identity may be found in the paging record), the UE can ignore/skip the reception of additional paging occasion. The UE may start to monitor paging from another cell if the UE finishes monitoring both the first paging occasion and the addition paging occasion without receiving any paging record.

Figure 2C:
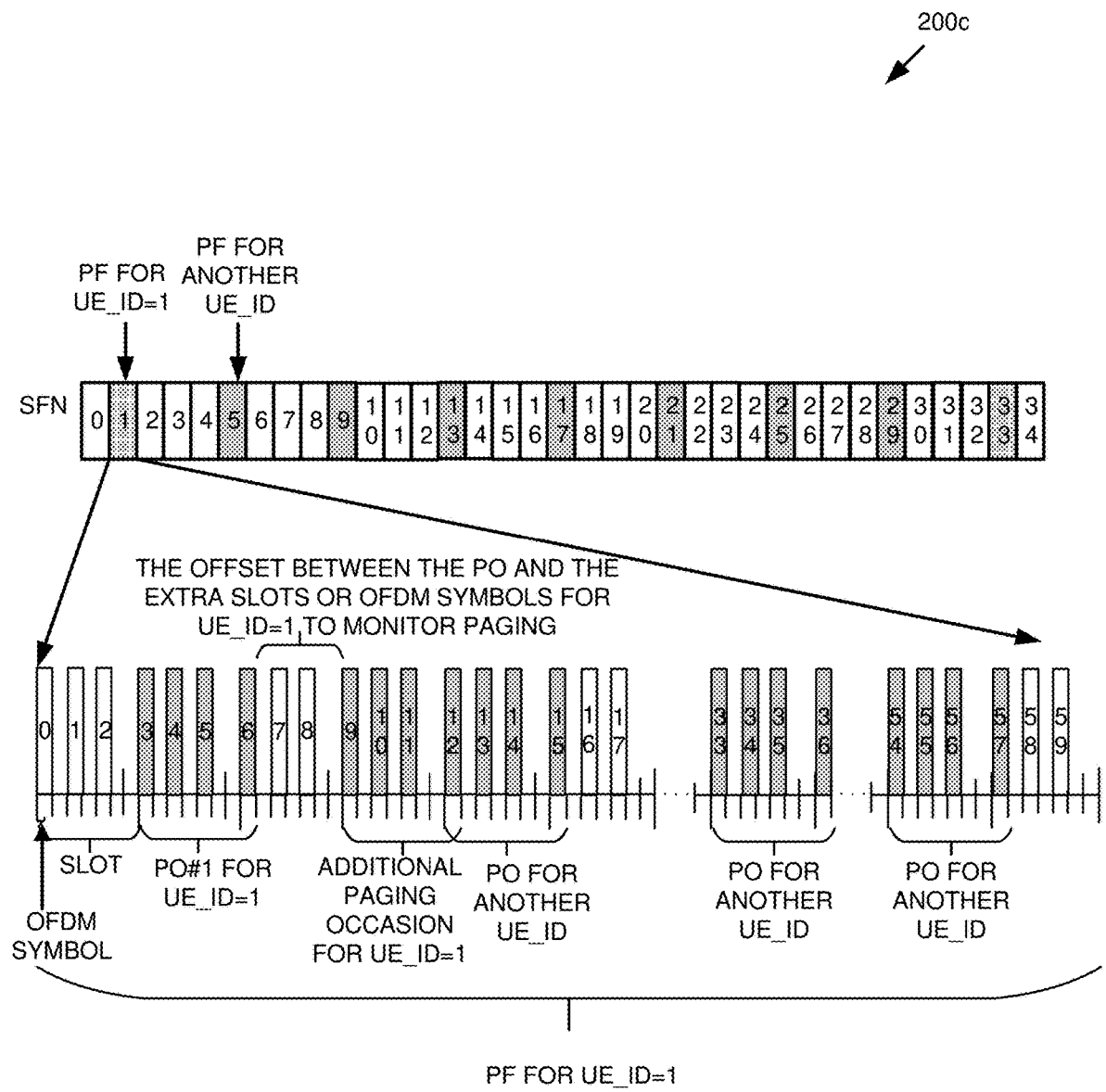
FIG. 2C illustrates a block diagram of a second example series of paging frames and a paging occasion with a symbol level offset.

FIG. 2C illustrates a block diagram 200c of a second example series of paging frames and a paging occasion with a symbol level offset. Similarly, as shown in FIG. 2C, the symbol level offset "+12" may be configured to the UE, which indicates that the additional paging occasion is after the calculated PO and there may be twelve symbols between the PO calculated and the additional paging occasion. In addition to the PO #1, an additional paging occasion may be configured as the paging occasion for UE_ID=1. For the concerned UE, an identical paging record may be sent on both the paging occasion and the additional paging occasion. For each paging DRX cycle, once the corresponding paging record is received on the first paging occasion (i.e., the corresponding PagingUE-Identity is found in the paging record), the UE can ignore/skip the reception of additional paging occasion. The UE may start to monitor paging from another cell if UE finish monitoring both the first paging occasion and the addition paging occasion without receiving any paging record.

Example Embodiment 3

Figure 3A:
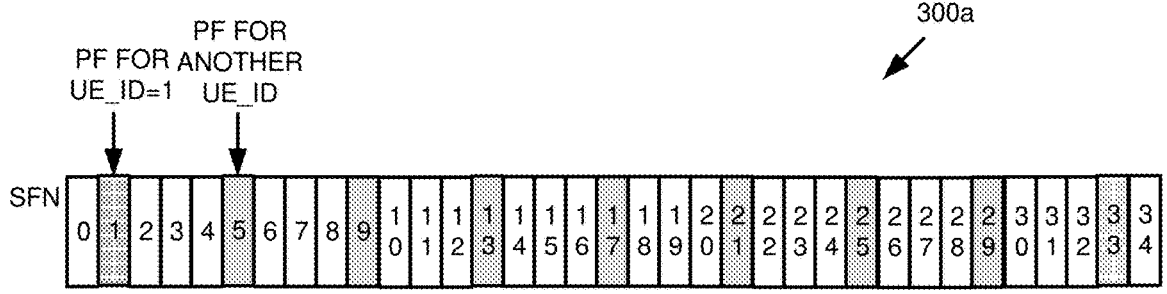
FIG. 3A illustrates a block diagram of an example series of paging frames.

FIG. 3A illustrates a block diagram 300a of an example series of paging frames. The DU may receive UE capability from CU through a F1 interface and determine to send a paging message on additional paging occasion for UE_ID=1. The additional paging occasion may be located offset after the paging occasion. The network may include a configuration for the reception of additional paging occasion, which is the offset in paging frame level in the RRCRelease message and may send it to UE to release it into RRC_INACTIVE state. The location of the additional paging occasion within the additional paging frame may be the same as the location of the first paging occasion in the first paging frame.

Figure 3B:
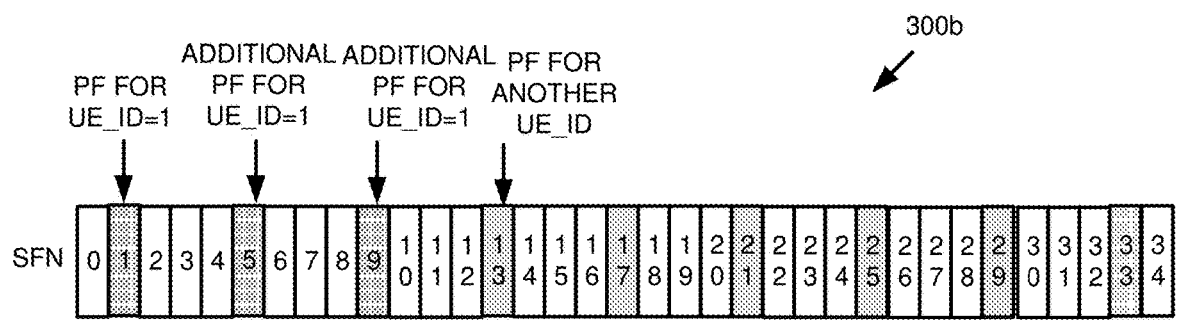
FIG. 3B illustrates a block diagram of a first example series of paging frames with a paging occasion with a common paging frame level offset.

FIG. 3B illustrates a block diagram 300b of a first example series of paging frames with a common offset. As shown in FIG. 3B, two additional paging occasions may be configured. A common PF level offset "+0" may be configured to a UE via RRCRelease message. The common offset "+0" may indicate that the first additional paging occasion is after the first paging occasion and there is one PF between the first paging occasion and the first additional paging occasion while the second additional paging occasion is after the first additional paging occasion and there is one PF between the first and the second additional paging occasion. For the relevant UE, an identical paging record may be sent on both the paging occasion and the additional paging occasions. For each paging DRX cycle, once the corresponding paging record is received on the first paging occasion (i.e., the corresponding PagingUE-Identity is found in the paging record), the UE can ignore/skip the reception of additional paging occasions. The UE may start to monitor paging from another cell after receiving paging from one cell on the first paging occasion or additional paging occasions.

Figure 3C:
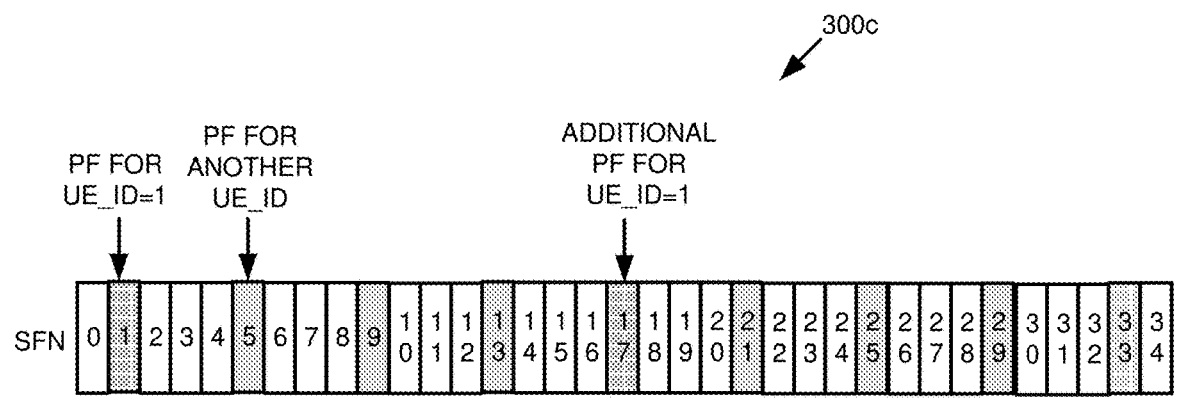
FIG. 3C illustrates a block diagram of a second example series of paging frames with a paging occasion with a paging frame level offset.
Figure 3D:
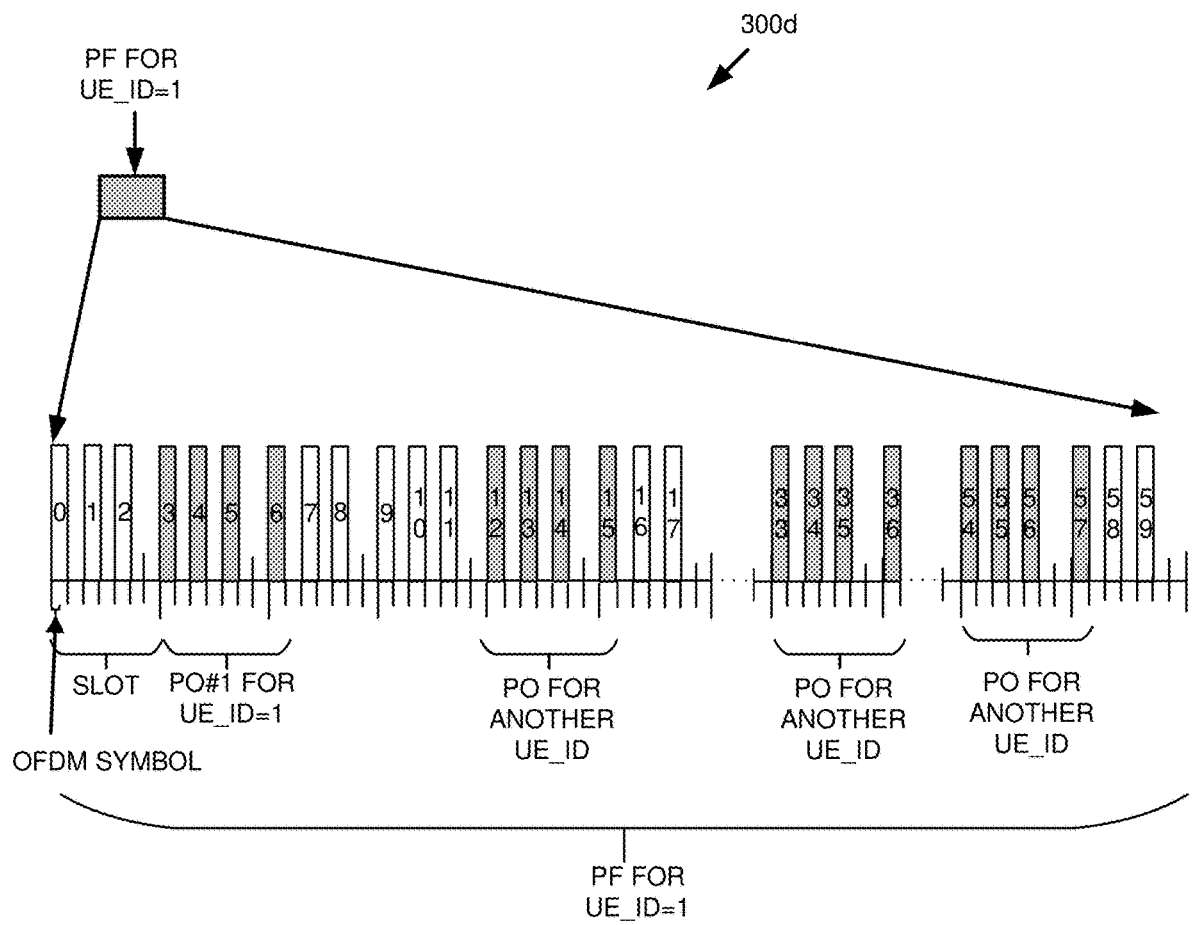
FIG. 3D illustrates a block diagram of an example paging frame and paging occasion.

FIG. 3C illustrates a block diagram 300c of second example series of paging frames with a offset. Similarly, as shown in FIG. 3C, an additional paging occasion is configured. The PF level offset "+3" may indicate that the additional paging occasion is after the first paging occasion and there may be three PFs between the first paging occasion and the additional paging occasion. For the relevant UE, an identical paging record may be sent on both the first paging occasion and the additional paging occasion. For each paging DRX cycle, once the corresponding paging record is received on the additional paging occasion (i.e., the corresponding PagingUE-Identity is found in the paging record), the UE can ignore/skip the reception of first paging occasion. The UE may start to monitor paging from another cell after receiving paging from one cell on the first paging occasion or additional paging occasion. FIG. 3D illustrates a block diagram 300d of an example paging frame and paging occasion. The structure of the additional paging frame and the location of the additional paging occasion within the additional paging frame may be shown in FIG. 3D, which may be the same as the structure of the first paging frame and the location of the first paging occasion within the first paging frame Example Embodiment 4

Figure 4A:
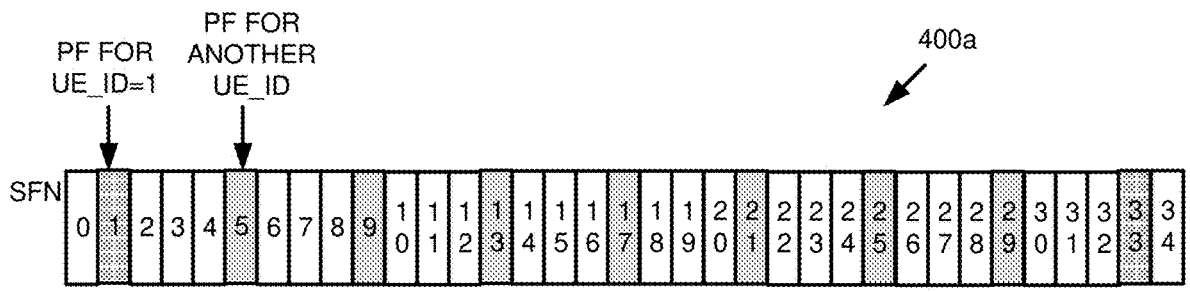
FIG. 4A illustrates a block diagram of an example series of paging frames.

FIG. 4A illustrates a block diagram 400a of an example series of paging frames. The network may receive UE capability from the Core Network through S1 or NG-C interface and may determine to send a paging message on additional paging occasion for UE_ID=1.

Figure 4B:
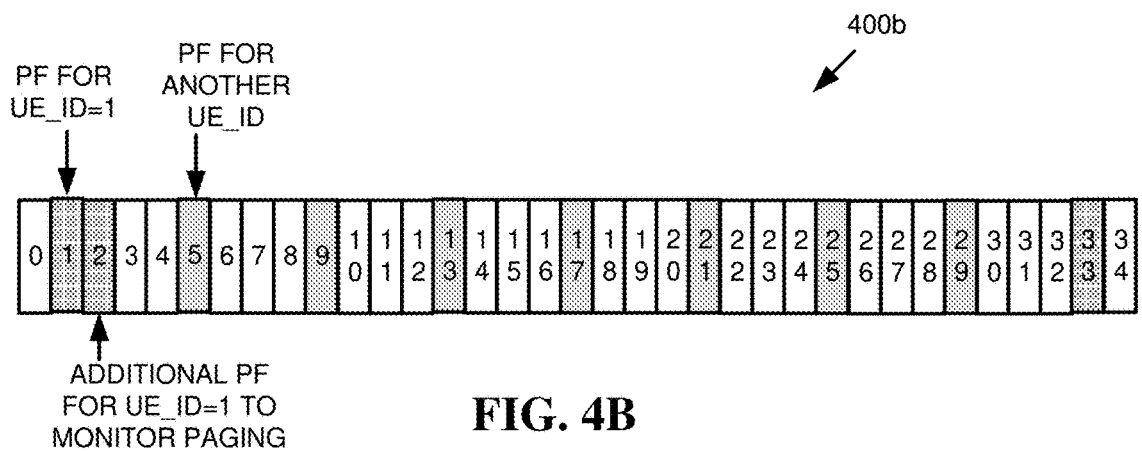
FIG. 4B illustrates a block diagram of a first example series of paging frames with an additional radio frame.

FIG. 4B illustrates a block diagram 400b of an example series of paging frames with an additional radio frame. The additional paging occasion may be located offset after the first paging occasion. The NW may include a configuration for the reception of additional paging occasion, which is the offset in radio frame level in the system information. The location of the additional paging occasion within the additional paging frame may be the same as the structure of the first paging frame and the location of the first paging occasion within the first paging frame. As shown in FIG. 4B, an additional paging occasion may be configured.

A radio frame level offset "+0" may be configured to the UE via system information. The offset "+0" may indicate that the first additional paging occasion is in the radio frame right after the first paging frame. For the relevant UE, an identical paging record may be sent on both the first paging occasion and the additional paging occasion. For each paging DRX cycle, once the corresponding paging record is received on the first paging occasion (i.e., the corresponding PagingUE-Identity is found in the paging record), the UE can ignore/skip the reception of additional paging occasion. The UE may start to monitor paging from another cell if UE finish monitoring both the first paging occasion and the addition paging occasion without receiving any paging record.

Figure 4C:
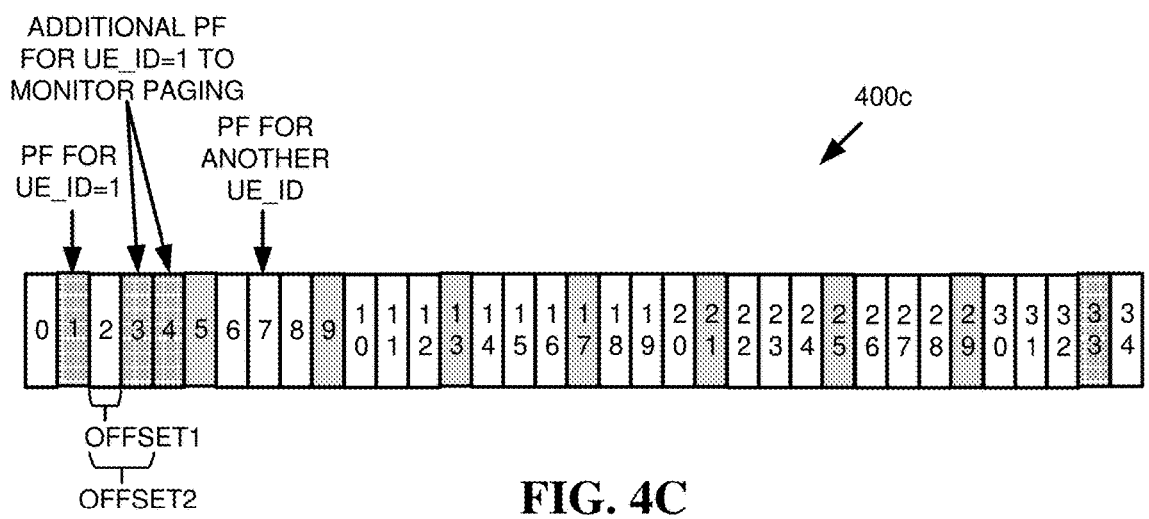
FIG. 4C illustrates a block diagram of an example series of paging frames with multiple additional radio frames with a radio frame offset.

FIG. 4C illustrates a block diagram 400c of an example series of paging frames with a multiple additional radio frames with a radio frame offset. Similarly, as shown in FIG. 4C, two additional paging occasions may be configured. In some embodiments, two offsets may be configured. The radio frame level offset1 "+1" may indicate that the first additional paging occasion is after the first paging occasion and there is one radio frame between the first paging occasion and the first additional paging occasion. The radio frame level offset2 "+2" may indicate the second additional paging occasion. In the embodiment as shown in FIG. 4C, two additional paging occasions and two offsets may be configured.

The radio frame level offset1 "+1" may indicate that the first additional paging occasion is after the first paging occasion and there may be one radio frame between the first paging occasion and the first additional paging occasion. The radio frame level offset2 "+2" may indicate that the second additional paging occasion is after the first paging occasion and there may be two radio frames between the first paging occasion and the second additional paging occasion. For the relevant UE, an identical paging record may be sent on both the first paging occasion and the additional paging occasions. For each paging DRX cycle, once the corresponding paging record is received on the first paging occasion (i.e., the corresponding PagingUE-Identity is found in the paging record), the UE can ignore/skip the reception of additional paging occasions. The UE may start to monitor paging from another cell if UE finish monitoring both the first paging occasion and the addition paging occasion without receiving any paging record.

Figure 4D:
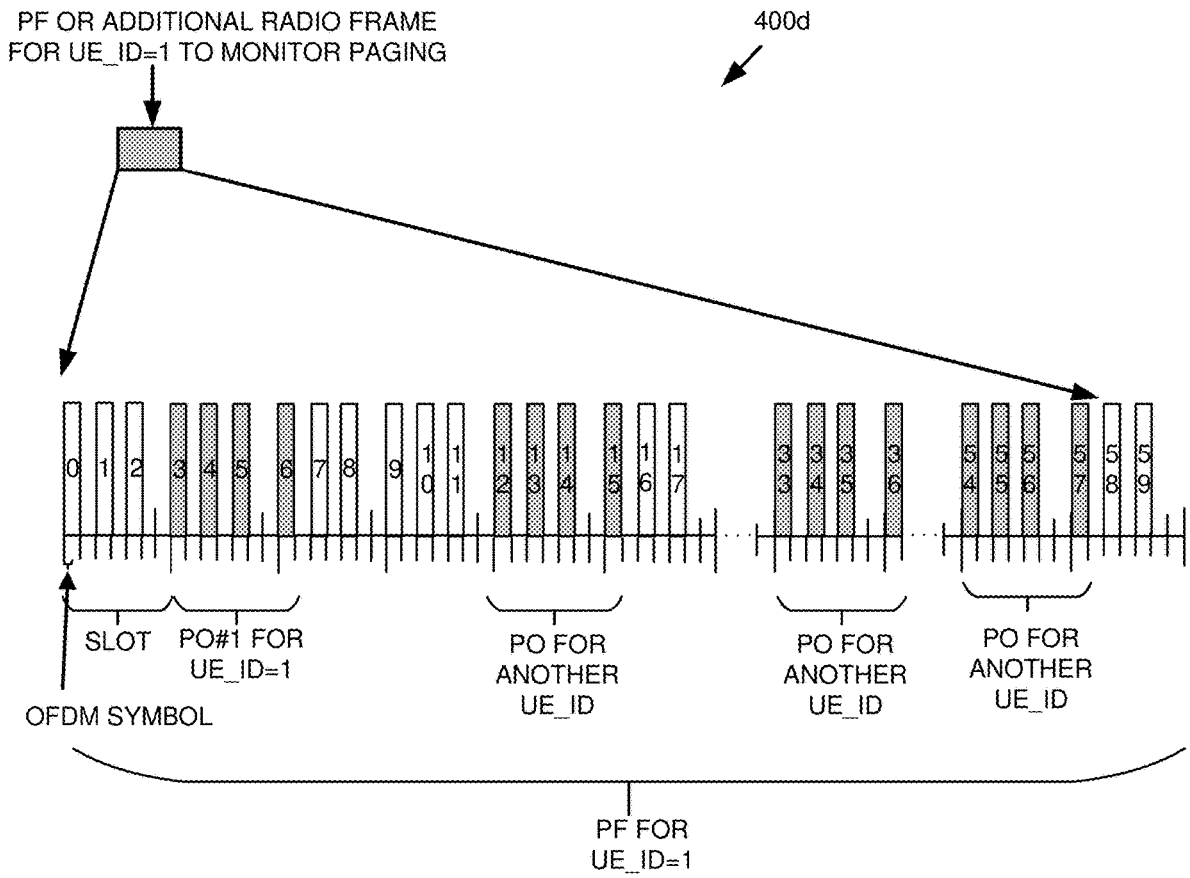
FIG. 4D illustrates a block diagram of an example paging frame and paging occasion.
Figure 5:
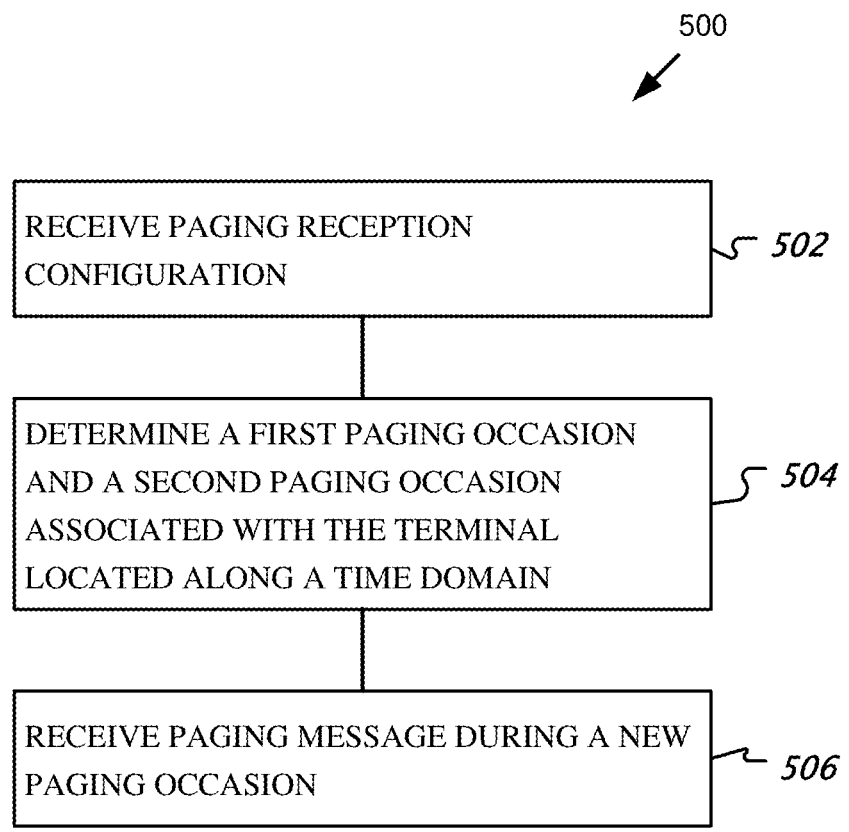
FIG. 5 illustrates a block diagram of an example method for reducing unsuccessful paging.

FIG. 4D illustrates a block diagram 400d of an example paging frame and paging occasion. The structure of the additional paging frame and the location of the additional paging occasion within the additional paging frame may be shown in FIG. 4D, which is the same as the structure of the first paging frame and the location of the first paging occasion within the first paging frame FIG. 5 illustrates a block diagram 500 of a method to reduce unsuccessful paging. The method 500 may include receiving a paging reception configuration from a communication node (block 502).

The method may also include determining a first paging occasion and a second paging occasion associated with the terminal and located in a paging frame with respect to a time domain based on receiving the paging reception configuration (block 504). The first paging occasion may include a paging occasion supported by a legacy standard, and a location of the first paging occasion may be determined by the specified formula. There may be any number of suitable paging occasions configured for the terminal. Any of the first paging occasion and a second paging occasion may be located in time domain periodically. In some embodiments, a period for the first paging occasion and second paging occasion may be the same. For each period, there may be at least one first paging occasion instance and one second paging occasion instance The method may also include receiving a paging message from the communication node during an additional paging occasion (block 706). Receiving the paging message may be based on monitoring a PDCCH addressed to a paging radio network temporary identifier (RNTI) on a paging occasion.

In some embodiments, the method includes determining, by the terminal, a location of the second paging occasion based on a location of the first paging occasion, wherein the location of the first paging occasion is determined by a specified formula, the specified formula including: (SFN+ PF_offset) mod T=(T div N)*(UE_ID mod N).

In some embodiments, a location of the second paging occasion is located offset to a location of the first paging occasion in time domain.

In some embodiments, the location of the second paging occasion that is offset to the location of the first paging occasion is either fixed or configured from the communication node to the terminal by radio resource control (RRC) signaling.

In some embodiments, the RRC signaling comprises one of broadcast system information and dedicated RRC signaling.

In some embodiments, the offset of the location of the second paging occasion to the location of the first paging message is one of positive or negative, wherein a positive offset indicates that the location of the second paging occasion is after the location of the first paging message, and wherein a negative offset indicates that the location of the second paging occasion is before the location of the first paging message.

In some embodiments, the method includes determining, by the terminal, the location of the second paging occasion based on a second paging identifier indicative of the second paging occasion, where the second paging identifier is different from an identifier associated with the first paging occasion.

In some embodiments, the method includes transmitting, by the terminal, the second paging identifier to any of the communication node or a core network node.

In some embodiments, the method includes receiving, by the terminal, the second paging identifier from a core network node.

In some embodiments, the method includes receiving, by the terminal, paging at both first paging occasion and the second occasion associated with the terminal.

In some embodiments, the method includes receiving, by the terminal, a corresponding paging record on one of the first paging occasion or the second paging occasion associated with the terminal during a paging discontinuous reception (DRX) cycle, and skipping, by the terminal, reception of the paging message on one of the first paging occasion or the second paging occasion that did not transmit the corresponding paging record during the DRX cycle.

In some embodiments, the method includes monitoring, by the terminal, paging from a second cell after determining that a corresponding paging record was not received from the first cell on either the first paging occasion or the second paging occasion associated with the terminal.

In some embodiments, the method includes monitoring, by the terminal, paging from a second cell after reception of paging message from the first cell on either the first paging occasion or the second paging occasion associated with the terminal.

In another embodiment, a method for wireless communication comprises configuring a first paging occasion and a second paging occasion associated with a terminal. The method may also include determining whether to send a paging message on a second paging occasion. The method may also include transmitting a paging record to the terminal in both the first paging occasion and second paging occasion associated with the terminal.

In some embodiments, the method includes receiving, by the communication node, capability information relating to the terminal from a core network node to determine whether to send paging record on second paging occasion, wherein the capability information relating to the terminal is included in any of the paging message or an initial context setup request message. The communication node may receive the capability information relating to the terminal via a S1/NG-C interface, and a F1 interface may be affected as well, as a DU may encode a paging message. The communication node can be divided into Centralized Unit (CU) and Distributed Unit (DU) and a PAGING message which includes the paging information may be sent from CU to DU to enable DU to page the UE. The DU may receive UE capability from CU via an interface such as a F1 interface to determine whether to send a paging message on an additional paging occasion to UE. In the F1 interface, the UE capability can be included in the PAGING message.

In some embodiments, the method includes transmitting, by the communication node, a paging reception configuration to the terminal, wherein the terminal is configured to determine the second paging occasion associated with the terminal based on receiving the paging reception configuration.

In some embodiments, the paging reception configuration is transmitted to the terminal via one of broadcast system information or dedicated RRC signaling.

In some embodiments, the method includes receiving, by the communication node, a second paging identifier identifying the second paging occasion from any of the terminal or a core network node.

In some embodiments, a location of the second paging occasion is based on both a second paging identifier identifying the second paging occasion and the specified formula.

In some embodiments, a location of the second paging occasion is located offset to a location of the first paging occasion calculated based on the previously specified formula in time domain, wherein the offset is either fixed or configured from the communication node to the terminal by RRC signaling.

In some embodiments, the offset of the location of the second paging occasion to the location of the first paging message is one of positive or negative, wherein a positive offset indicates that the location of the second paging occasion is after the location of the first paging message, and wherein a negative offset indicates that the location of the second paging occasion is before the location of the first paging message.

In some embodiments, the location of the second paging occasion is located offset to a location of the first paging occasion by at least one radio frame.

In some embodiments, the location of the second paging occasion is located offset to a location of the first paging occasion by at least one slot.

In some embodiments, the location of the second paging occasion is located offset to a location of the first paging occasion by at least one orthogonal frequency-division multiplexing (OFDM) symbol.

In some embodiments, the location of the second paging occasion is located offset to a location of the first paging occasion by at least one paging frame.

In some embodiments, the location of the second paging occasion is located offset to a location of the first paging occasion by at least one paging occasion.

In some embodiments, the method includes transmitting, by the communication node, the paging record to the terminal on any of the first paging occasion and second paging occasion, during a paging discontinuous reception (DRX) cycle, wherein the terminal is allowed to skip reception of the second paging occasion upon receiving the paging record during the DRX cycle.

Figure 6:
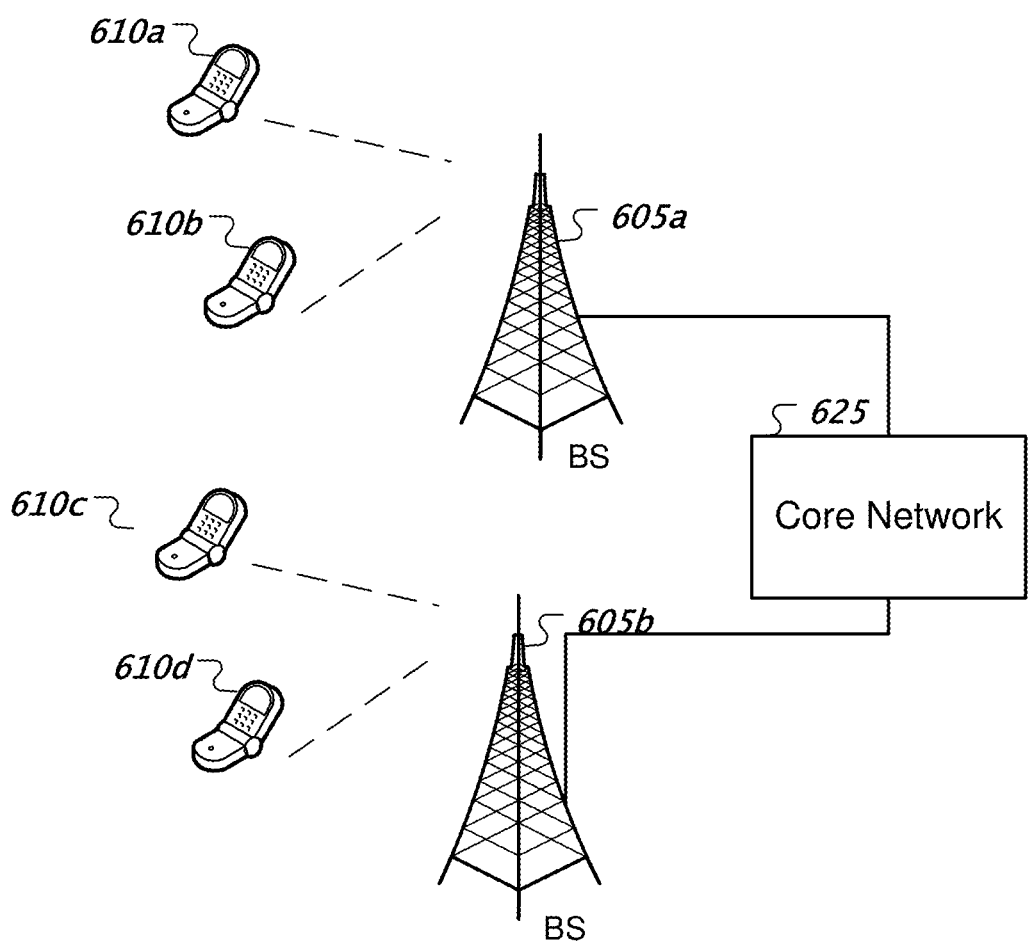
FIG. 6 shows an example of a wireless communication system where techniques in accordance with one or more embodiments of the present technology can be applied.

FIG. 6 shows an example of a wireless communication system where techniques in accordance with one or more embodiments of the present technology can be applied. A wireless communication system 600 can include one or more base stations (BSs) 605a, 605b, one or more wireless devices 610a, 610b, 610c, 610d, and a core network 625. A base station 605a, 605b can provide wireless service to wireless devices 610a, 610b, 610c and 610d in one or more wireless sectors. In some implementations, a base station 605a, 605b includes directional antennas to produce two or more directional beams to provide wireless coverage in different sectors.

The core network 625 can communicate with one or more base stations 605a, 605b. The core network 625 provides connectivity with other wireless communication systems and wired communication systems. The core network may include one or more service subscription databases to store information related to the subscribed wireless devices 610a, 610b, 610c, and 610d. A first base station 605a can provide wireless service based on a first radio access technology, whereas a second base station 605b can provide wireless service based on a second radio access technology. The base stations 605a and 605b may be co-located or may be separately installed in the field according to the deployment scenario. The wireless devices 610a, 610b, 610c, and 610d can support multiple different radio access technologies. In some embodiments, the base stations 605a, 605b may be configured to implement some techniques described in the present document. The wireless devices 610a to 610d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 7:
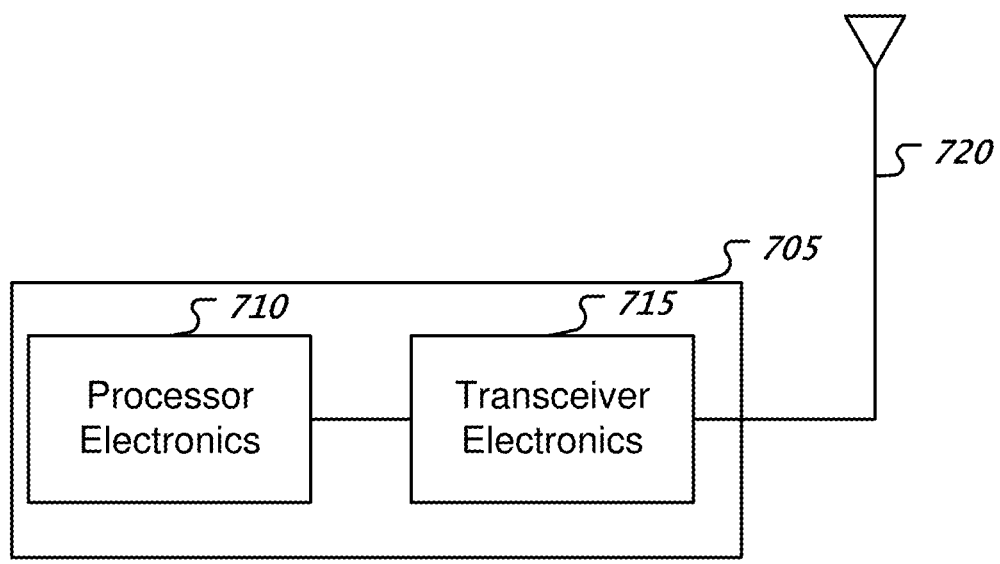
FIG. 7 is a block diagram representation of a portion of a hardware platform.

FIG. 7 is a block diagram representation of a portion of a hardware platform. A hardware platform 705 such as a network device or a base station or a wireless device (or UE) can include processor electronics 710 such as a microprocessor that implements one or more of the techniques presented in this document. The hardware platform 705 can include transceiver electronics 715 to send and/or receive wired or wireless signals over one or more communication interfaces such as antenna 720 or a wireline interface. The hardware platform 705 can implement other communication interfaces with defined protocols for transmitting and receiving data. The hardware platform 705 can include one or more memories (not explicitly shown) configured to store information such as data and/or instructions. In some implementations, the processor electronics 710 can include at least a portion of the transceiver electronics 715. In some embodiments, at least some of the disclosed techniques, modules or functions and network nodes are implemented using the hardware platform 705.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   receiving, by a terminal, a paging reception configuration from a communication node;
   determining, by the terminal, a first paging occasion and a second paging occasion associated with the terminal located along a time domain based on receiving the paging reception configuration; and
   receiving, by the terminal, a paging message from the communication node during the second paging occasion,
   wherein the determining of the first paging occasion and the second paging occasion further comprises:
   determining, by the terminal, a location of the second paging occasion based on a location of the first paging occasion, wherein the location of the first paging occasion is determined by a specified formula, or
   determining, by the terminal, the location of the second paging occasion based on the specified formula and a second paging identifier indicative of the second paging occasion, where the second paging identifier is different from an identifier associated with the first paging occasion, and wherein the second paging identifier is transmitted by the terminal to any of the communication node or a core network node, or received from a core network node.

2. The method of claim 1, wherein a location of the second paging occasion is located offset to the location of the first paging occasion in the time domain and, wherein an offset between the location of the second paging occasion and the location of the first paging occasion is 1) fixed, 2) configured from the communication node to the terminal by radio resource control (RRC) signaling, 3) has a positive value that indicates that the location of the second paging occasion is after the location of the first paging occasion, or 4) has a negative value that indicates that the location of the second paging occasion is before the location of the first paging occasion.

3. The method of claim 2, wherein the RRC signaling comprises one of broadcast system information and dedicated RRC signaling.

4. The method of claim 2, wherein the location of the second paging occasion is located offset to the location of the first paging occasion by at least one radio frame, at least one slot, at least one orthogonal frequency-division multiplexing (OFDM), at least one paging, or at least one paging occasion.

5. The method of claim 1, further comprising:
   receiving, by the terminal, a paging record at both the first paging occasion and the second paging occasion associated with the terminal.

6. The method of claim 1, further comprising:
   receiving, by the terminal, a corresponding paging record on one of the first paging occasion or the second paging occasion associated with the terminal during a paging discontinuous reception (DRX) cycle; and
   skipping, by the terminal, reception of the paging message on one of the first paging occasion or the second paging occasion in a same paging DRX cycle.

7. The method of claim 1, further comprising:
   monitoring, by the terminal, paging from a second cell after determining that a corresponding paging record was not received from a first cell on either the first paging occasion or the second paging occasion associated with the terminal.

8. A method for wireless communication, comprising:
   configuring, by a communication node, a first paging occasion and a second paging occasion associated with a terminal;
   determining, by the communication node, whether to send a paging message on the second paging occasion; and
   transmitting, by the communication node, a paging record to the terminal in both the first paging occasion and the second paging occasion associated with the terminal, and
   wherein the method further comprises:
   receiving, by the communication node, a second paging identifier identifying the second paging occasion from any of the terminal or a core network node.

9. The method of claim 8, further comprising:
   receiving, by the communication node, capability information relating to the terminal from a core network node to determine whether to send the paging record on the second paging occasion, wherein the capability information relating to the terminal is included in any of the paging message or an initial context setup request message.

10. The method of claim 8, further comprising:
    transmitting, by the communication node, a paging reception configuration to the terminal, wherein the terminal is configured to determine the second paging occasion associated with the terminal based on receiving the paging reception configuration and, wherein the paging reception configuration is transmitted to the terminal via one of broadcast system information or dedicated RRC signaling.

11. The method of claim 8, wherein a location of the second paging occasion is based on both a second paging identifier identifying the second paging occasion and a specified formula.

12. The method of claim 11, wherein the location of the second paging occasion is located offset to a location of the first paging occasion calculated based on the specified formula in a time domain, and wherein an offset between locations of the second paging occasion and the first paging occasion is 1) fixed, 2) configured from the communication node to the terminal by RRC signaling, 3) has a positive value that indicates that the location of the second paging occasion is after the location of the first paging occasion, or 4) has a negative value that indicates that the location of the second paging occasion is before the location of the first paging occasion.

13. The method of claim 12, wherein the location of the second paging occasion is located offset to the location of the first paging occasion by at least one radio frame, at least one slot, at least one orthogonal frequency-division multiplexing (OFDM), at least one paging, or at least one paging occasion.

14. The method of claim 8, further comprising:
transmitting, by the communication node, the paging record to the terminal on any of the first paging occasion and the second paging occasion during a paging DRX cycle, wherein the terminal is allowed to skip reception of the paging occasion upon receiving the paging record during the paging DRX cycle.

15. An apparatus for wireless communication comprising a processor that is operated as a terminal configured to:
receive a paging reception configuration from a communication node;
determine a first paging occasion and a second paging occasion associated with the terminal located along a time domain based on receiving the paging reception configuration;
receive a paging message from the communication node during the second paging occasion, wherein the processor is further configured to:
determine a location of the second paging occasion based on a location of the first paging occasion, wherein the location of the first paging occasion is determined by a specified formula, or determine the location of the second paging occasion based on the specified formula and a second paging identifier indicative of the second paging occasion, where the second paging identifier is different from an identifier associated with the first paging occasion, and wherein the second paging identifier is transmitted by the terminal to any of the communication node or a core network node, or received from a core network node.

16. The apparatus for wireless communication of claim 15, wherein a location of the second paging occasion is located offset to the location of the first paging occasion in the time domain and wherein an offset between the location of the second paging occasion and the location of the first paging occasion is 1) fixed, 2) configured from the communication node to the terminal by radio resource control (RRC) signaling, 3) has a positive value that indicates that the location of the second paging occasion is after the location of the first paging occasion, or 4) has a negative value that indicates that the location of the second paging occasion is before the location of the first paging occasion.

* * * * *